United States Patent
Liu et al.

(10) Patent No.: US 8,854,591 B2
(45) Date of Patent: Oct. 7, 2014

(54) DISPLAY PANEL AND METHOD FOR NARROWING EDGES AND INCREASING EDGE STRENGTH THEREOF

(75) Inventors: Yu Chen Liu, Hsin-Chu (TW); Chung Wei Liu, Hsin-Chu (TW); Shu Chih Wang, Hsin-Chu (TW); Chia Shin Weng, Hsin-Chu (TW)

(73) Assignee: Au Optronics Corporation, Hsin-Chu (TW)

( * ) Notice: Subject to any disclaimer, the term of this patent is extended or adjusted under 35 U.S.C. 154(b) by 429 days.

(21) Appl. No.: 12/710,688

(22) Filed: Feb. 23, 2010

(65) Prior Publication Data
US 2011/0025940 A1    Feb. 3, 2011

(30) Foreign Application Priority Data
Jul. 30, 2009   (TW) ............................... 98125626 A

(51) Int. Cl.
*G02F 1/1339* (2006.01)
*G02F 1/1333* (2006.01)
(52) U.S. Cl.
CPC ......... *G02F 1/1333* (2013.01); *H01J 2209/267* (2013.01)
USPC .......................................... 349/153; 349/155
(58) Field of Classification Search
CPC   G02F 1/1339; G02F 1/13392; G02F 1/13394
USPC .................................................. 349/153–156
See application file for complete search history.

(56) References Cited

U.S. PATENT DOCUMENTS

| | | | |
|---|---|---|---|
| 4,494,825 A * | 1/1985 | Sasaki et al. | 349/154 |
| 6,705,584 B2 * | 3/2004 | Hiroshima et al. | 349/155 |
| 7,268,850 B2 * | 9/2007 | Liao | 349/153 |
| 7,433,014 B2 * | 10/2008 | Kim et al. | 349/156 |
| 8,325,319 B2 * | 12/2012 | Ikeguchi | 349/155 |

FOREIGN PATENT DOCUMENTS

| | | |
|---|---|---|
| CN | 1649799 | 8/2005 |
| JP | 2001-133760 | 5/2001 |
| JP | 2008-89774 | 4/2008 |
| JP | 2009103858 A | 5/2009 |

(Continued)

OTHER PUBLICATIONS

Office Action issued Dec. 22, 2012 for TW counterpart application No. 098125626 cites TW I302210, TW 594294, TW 200701303A, and US 7433014B2.
English Abstract of Office Action issued Dec. 22, 2012 for TW counterpart application No. 098125626.

(Continued)

*Primary Examiner* — Dung Nguyen
(74) *Attorney, Agent, or Firm* — WPAT, P.C.; Anthony King

(57) ABSTRACT

An edge narrowing method for a display panel is disclosed. The display panel includes a first substrate, a second substrate, a sealant and a light-shielding area. The sealant is disposed between the first substrate and the second substrate. The light-shielding area is disposed between the first substrate and the sealant. The method includes the steps of providing the display panel, a grinding apparatus and a polishing apparatus; tilting the display panel so that the first substrate and a grinding member of the grinding apparatus have a first grinding angle therebetween; grinding the first substrate and the light-shielding area with the grinding apparatus while the display panel is tilted at the first grinding angle, thereby forming a first grinding end surface; stopping grinding of the first substrate and the light-shielding area when the width of the light-shielding area is between 0.35 and 1 mm; and polishing the first grinding end surface with the polishing apparatus to form a first end surface.

3 Claims, 11 Drawing Sheets

(56) References Cited

FOREIGN PATENT DOCUMENTS

| TW | 584762 | 4/2004 |
|---|---|---|
| TW | 594163 | 6/2004 |
| TW | 594294 | 6/2004 |
| TW | 200701303 A | 1/2007 |
| TW | I302210 | 10/2008 |

OTHER PUBLICATIONS

English Abstract of TW I302210, TW 594294, TW 200701303A.
Office Action dated Jul. 10, 2013 from China counterpart application 201110175958.0 which cites JP 2009103858A.
English abstract translation for Office Action dated Jul. 10, 2013 from China counterpart application 201110175958.0.

* cited by examiner

DISPLAY PANEL AND METHOD FOR NARROWING EDGES AND INCREASING EDGE STRENGTH THEREOF

BACKGROUND OF THE INVENTION (A) Field of the Invention

The present invention relates to display panel technologies, and more specifically, to a liquid crystal display panel and methods for narrowing edges and increasing edge strength thereof.

(B) Description of Related Art

Liquid crystal displays (LCD) have many advantages such as thin profile, light weight, low power consumption and low radiation, and therefore are widely used in current display applications. An LCD display primarily includes an LCD panel and a back light unit. The back light unit serves as an illumination source for the LCD panel, and the rotations of the liquid crystals are controlled by electrical signals so as to display images.

As the technology of portable mobile apparatus advances, in order to meet demands of artistic appearance and miniature size, the side frames of the display panel need to be narrowed. However, the requirements are not met by means of narrowing the design only. The panel strength needs to be considered when the side frames are narrowed, which makes the narrowing process relatively difficult.

Therefore, there is high demand to narrow the display panel edges and sustain the strength of the side frames to avoid panel damage.

SUMMARY OF THE INVENTION

In order to resolve the above problems, the present invention provides a display panel and methods for narrowing edges and increasing edge strength, so as to effectively narrow the side frames of the display panel and increase the strength of side frames to meet the demand of narrowing edges of the display panel.

According to a first embodiment of the present invention, a method for narrowing edges of a display panel is disclosed. The display panel includes a first substrate, a second substrate, a sealant and a light-shielding area, the sealant being disposed between the first substrate and the second substrate, the light-shielding area being disposed between the sealant and the first substrate. The method for narrowing edges includes the steps of providing the display panel, a grinding apparatus and a polishing apparatus; tilting the display panel so that the first substrate and a grinding member of the grinding apparatus form a first grinding angle; grinding the first substrate and the light-shielding area with the grinding apparatus to form a first grinding end surface on the first substrate while the display panel is tilted at the first grinding angle; stopping grinding of the first substrate and the light-shielding area when the width of the light-shielding area is between 0.35 and 1 mm; and polishing the first grinding end surface with the polishing apparatus to form a first end surface. Moreover, the second substrate or the sealant may be ground and polished while the display panel is tilted at the first tilt angle; alternatively, the display panel is tilted so that the display panel and the grinding apparatus form a second grinding angle. The second substrate and/or the sealant may be ground and polished while the display panel is tilted at the second grinding angle.

According to a second embodiment of the present invention, a method for increasing edge strength of a display panel is disclosed. The display panel includes a first substrate, a second substrate and a sealant, the sealant being disposed between the first substrate and the second substrate. The method for increasing edge strength includes the steps of providing the display panel, a grinding apparatus and a polishing apparatus; tilting the display panel so that the second substrate of the display panel and a grinding member of the grinding apparatus form a grinding angle; grinding the second substrate with the grinding apparatus to form a grinding end surface on the second substrate while the display panel is tilted at the grinding angle; and polishing the grinding end surface with the polishing apparatus to form an end surface.

According to a third embodiment of the present invention, a display panel includes a first substrate, a second substrate and a sealant. The first substrate includes a first outer surface, a first inner surface and a first end surface, the first outer surface and the first end surface having a first included angle therebetween. The second substrate is disposed opposite to the first substrate and includes a second outer surface, a second inner surface and a second end surface, the second outer surface and the second end surface having a second included angle therebetween. The sealant is disposed between the first inner surface and the second inner surface, and includes a sealant end surface between the first end surface and the second end surface. The arithmetic average roughness Ra of the first end surface or the second end surface is between 0.001 and 0.04 µm, and the maximum roughness height Ry of the first end surface or the second end surface is between approximately 0.1 and 0.5 µm. In an embodiment, the first included angle is between 95 and 110 degrees.

According to a fourth embodiment of the present invention, a display panel includes a first substrate, a second substrate, a sealant and a light-shielding area. The first substrate includes a first inner surface and a first end surface. The second substrate is disposed opposite to the first substrate and includes a second inner surface and a second end surface. The sealant is disposed between the first inner surface and the second inner surface, and includes a sealant end surface between the first end surface and the second end surface. The light-shielding area is disposed between the first inner surface and the sealant, and includes an outer end surface and an inner end surface. The outer end surface is connected to the first end surface and the sealant end surface, and the outer end surface and the inner end surface are separated by a minimum distance between 0.35 and 1 mm.

According to a fifth embodiment of the present invention, a method for narrowing edges of a display panel is disclosed. The display panel includes a first substrate, a second substrate, a sealant, an initial first photo spacer, a second photo spacer and a liquid crystal layer, the initial first photo spacer and the second photo spacer forming a trench at an edge of the first substrate, the initial first photo spacer being placed outside the sealant and far from the liquid crystal layer, the second photo spacer being placed inside the sealant and next to the liquid crystal layer, the sealant and the liquid crystal layer being placed between the first substrate and the second substrate, and the sealant being within the trench. The method for narrowing edges includes the steps of providing the display panel and a cutting apparatus; and simultaneously cutting the first substrate, the initial first sensing spacer and the second substrate with the cutting apparatus to form a first photo spacer and an end surface, the end surface going through the first substrate, the first photo spacer and the second substrate.

According to a sixth embodiment of the present invention, a display panel includes a first substrate, a second substrate disposed opposite to the first substrate, a liquid crystal layer, a first photo spacer, a second photo spacer and a sealant. The liquid crystal layer is disposed between the first substrate and the second substrate. The first photo spacer is disposed on the first substrate and between the first substrate and the second substrate. The second photo spacer is disposed on the first substrate and between the first substrate and the second substrate, and the second photo spacer and the first photo spacer form a trench therebetween. The sealant is disposed between the first substrate and the second substrate and within the trench. The first photo spacer is placed outside the sealant and far from the liquid crystal layer, and the second photo spacer is placed inside the sealant and next to the liquid crystal layer. The first photo spacer and the first substrate and the second substrate at a corresponding position form an end surface going through the first substrate, the first photo spacer and the second substrate.

In view of the above panel structure, the present invention discloses a display panel including a first substrate, a second substrate and a liquid crystal confined structure. The first substrate includes a first outer surface, a first inner surface and a first end surface, the first outer surface and the first end surface having a first included angle therebetween. The second substrate is disposed opposite to the first substrate and includes a second outer surface, a second inner surface and a second end surface, the second outer surface and the second end surface having a second included angle therebetween. The liquid crystal confined structure is disposed between the first inner surface and the second inner surface, and includes a liquid crystal confined structure end surface between the first end surface and the second end surface. The arithmetic average roughness Ra of the first end surface or the second end surface is between 0.001 and 0.04 μm, and the maximum roughness height Ry of the first end surface or the second end surface is between around 0.1 and 0.5 μm.

The liquid crystal confined structure may include the sealant, or the first photo spacer, the second photo spacer and the sealant between the first photo spacer and the second photo spacer.

According to the display panel and the methods for narrowing edges and increasing edge strength of the present invention, the width of the side frames can be decreased to between 0.35 mm and 1 mm, and the strength loss problem caused by edge narrowing can be effectively resolved. Therefore, the present invention is practical.

DETAILED DESCRIPTION OF THE INVENTION

The making and use of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The display panel and the methods for narrowing edges and increasing edge strength of the present invention are described with appended drawings below.

Figure 1:
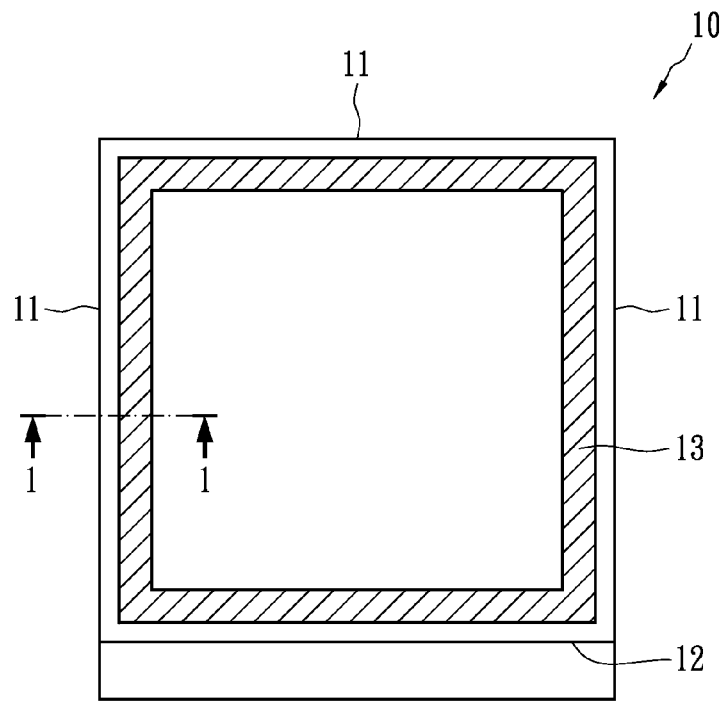
FIG. 1 shows a top view of a display panel.

The method for narrowing edges of a display panel is stated as follows: FIG. 1 shows a top view of a display panel 10 including three first sides 11 and a second side 12. The second side 12 is used for connecting the circuits (not shown) in the display panel to external circuit boards (not shown). The three first sides 11 and the second side 12 are mutually connected. A light-shielding area 13 close to the first sides 11 and the second side 12 is formed, and may use the same material as black matrix or may be formed with the black matrix at the same time. The edge narrowing of the present invention is applied to the first sides 11, and is exemplified below.

Figure 2:
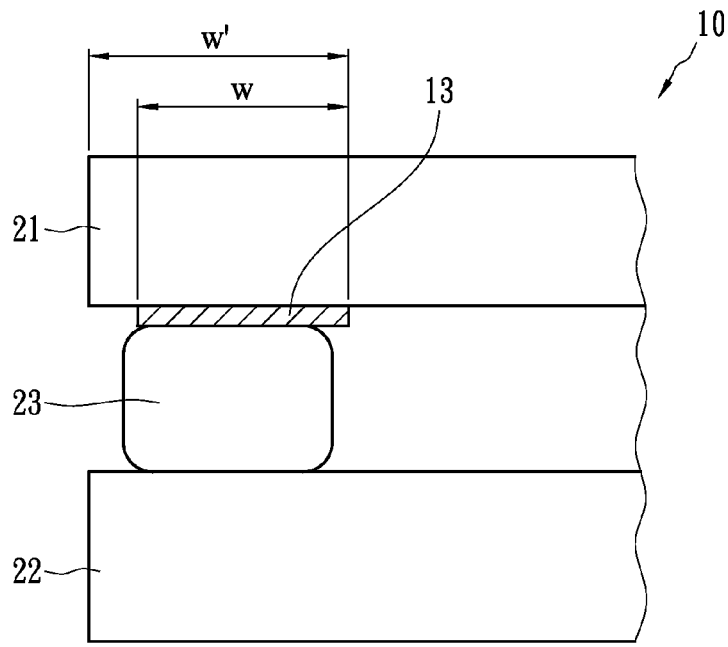
FIG. 2 shows the cross-sectional view along line 1-1 of FIG. 1.

FIG. 2 shows a cross-sectional view of line 1-1 of FIG. 1. The display panel 10 includes a first substrate 21, a second substrate 22 and a sealant 23 (liquid crystal confined structure). In an embodiment, the first substrate 21 may be a color filter array substrate (CF substrate), and the second substrate 22 may be a thin film transistor array substrate (TFT substrate). Alternatively, the first substrate 21 may be a thin film transistor array substrate, and the second substrate 22 may be a color filter array substrate. The light-shielding area 13 is disposed below the first substrate 21 including color filter array (not shown), and approximately corresponds to the sealant 23. The sealant 23 is disposed between the first substrate 21 and the second substrate 22, and the light-shielding area 13 with a width w is disposed between the sealant 23 and the first substrate 21. The width of side frame is denoted by w', which is from the inner edge of the light-shielding area 13 to the outer edge of the first substrate 21 and/or the second substrate 22.

Figure 3:
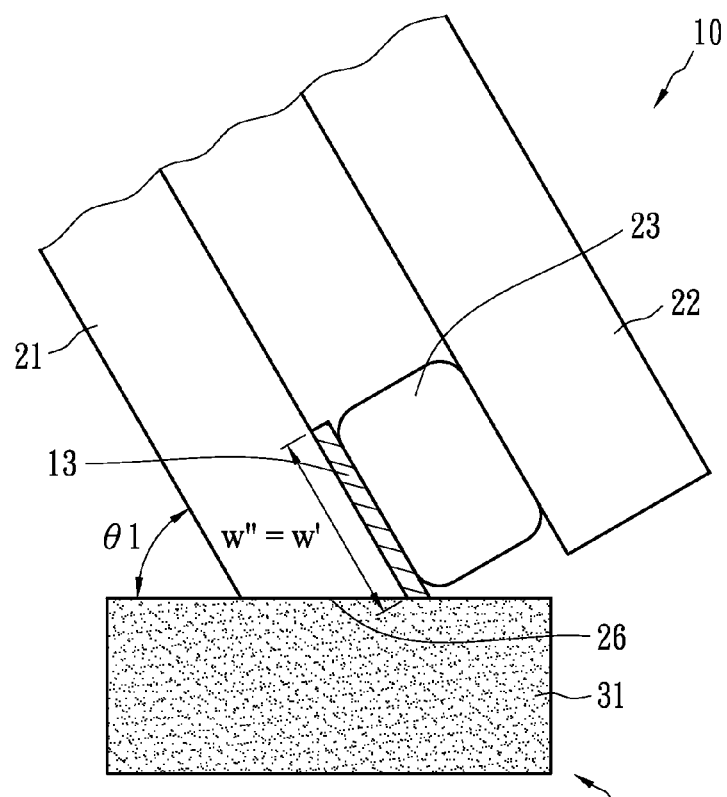
FIGS. 3 and 4 show a grinding process for narrowing edges of the display panel in accordance with an embodiment of the present invention.

Referring to FIG. 3, the display panel 10 is tilted, so that a first grinding angle θ1 is formed between the first substrate 21 and a grinding member 31 of a grinding apparatus 30, and θ1 is an acute angle. That is, the display panel 10 is tilted corresponding to the grinding member 31 of the grinding apparatus 30; in other words, the display panel 10 is tilted. While the display panel 10 is tilted with the first grinding angle θ1, the first substrate 21 is ground by the grinding member 31 of the grinding apparatus 30, and the light-shielding area 13 is ground as well, so as to form a first grinding end surface 26 on the first substrate 21. In an embodiment, the first grinding angle θ1 may be between approximately 70 and 88 degrees, and is preferably between 78 and 85 degrees. When the remaining width w" of the light-shielding area 13 is between approximately 0.35 and 1 mm, grinding of the first substrate 21 and the light-shielding area 13 by the grinding apparatus 30 is stopped. After grinding, the exceeding portion of the side frame width w' compared to the light-shielding area width w" is removed, so that the side frame width w' is equivalent to the light-shielding area width w''', i.e., the side frame width w' is between approximately 0.35 and 1 mm. The first grinding end surface 26 has average roughness Ra between 0.1 and 0.88 μm and maximum roughness height Ry between around 0.93 and 8.5 μm.

Figure 4:
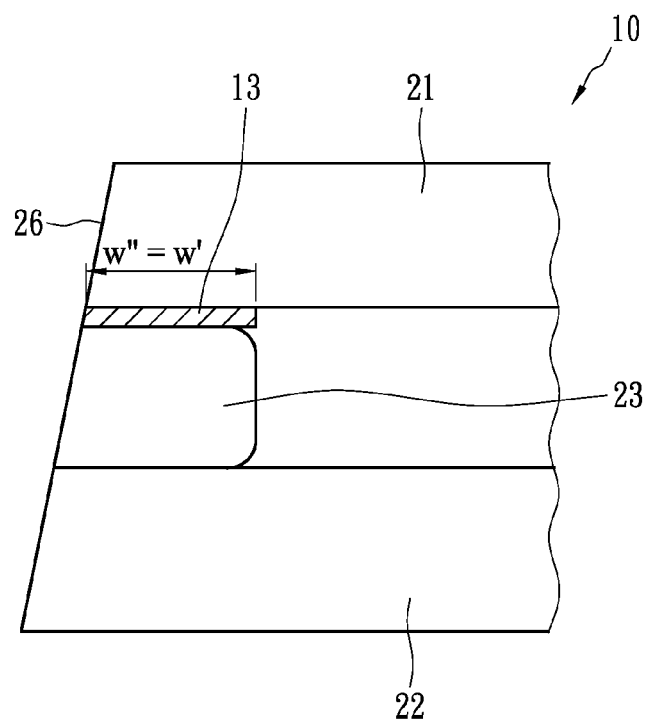

In an embodiment, the grinding apparatus 30 continues to grind the sealant 23 and the second substrate 22 while the display panel 10 is tilted at the first grinding angle θ1, and as a result the ground display panel 10 appears as shown FIG. 4, in which the edges of the first substrate 21, the light-shielding area 13, the sealant 23 and the second substrate 22 are aligned in a common plane.

Figure 5:
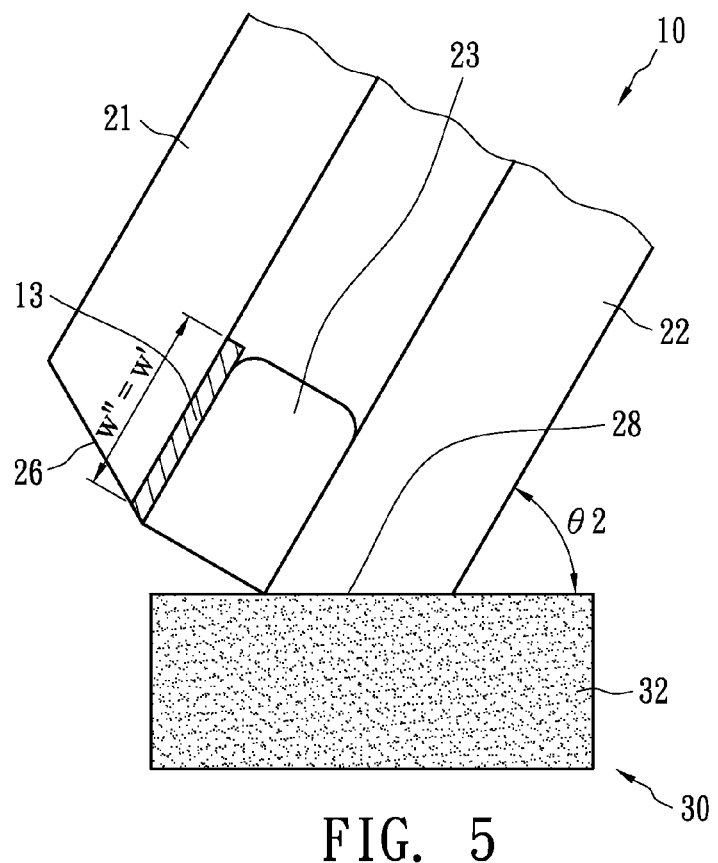
FIGS. 5 and 6 show a grinding process for narrowing edges of the display panel in accordance with another embodiment of the present invention.
Figure 6:
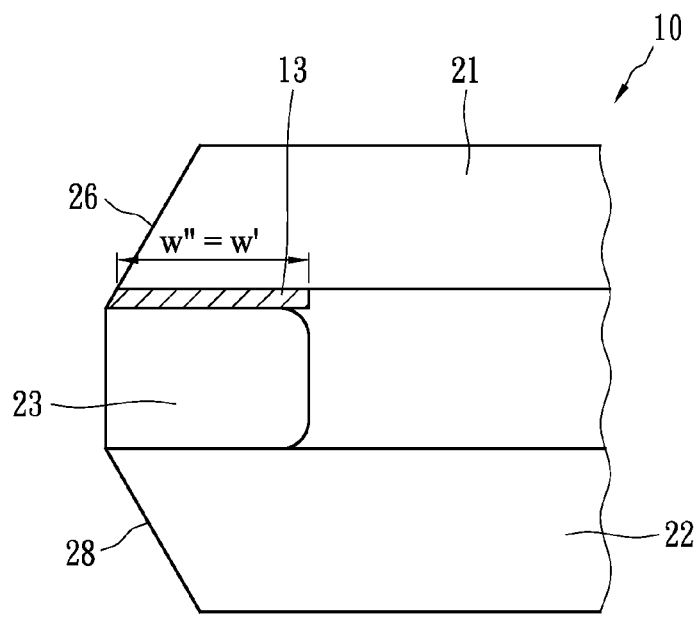

Referring to FIG. 5, in another embodiment, after grinding the first substrate 21, the display panel 10 is tilted at another side, so that the second substrate 22 and the grinding apparatus 30 form a second grinding angle θ2 therebetween. That is, the display panel 10 is tilted corresponding to the grinding member 32 of the grinding apparatus 30; in other words, the display panel 10 is tilted. While the display panel 10 is tilted at the first grinding angle θ2, the second substrate 22 is ground by the second grinding member 32 of the grinding apparatus 30, so as to form a second grinding end surface 28 on the second substrate 22, as shown in FIG. 6. At this time, the side frame width w' is equivalent to the light-shielding area width w". The second grinding angle θ2 may be between approximately 70 and 88 degrees, and is preferably between 78 and 85 degrees. The ground second substrate 22 is shown in FIG. 6. The second grinding end surface 28 has average roughness Ra between 0.1 and 0.88 μm and maximum roughness height Ry between approximately 0.93 and 8.5 μm.

More specifically, the grinding apparatus 30 may include the first grinding member 31 and the second grinding member 32. The first grinding member 31 is used to grind the first substrate 21 and the light-shielding area 13 or the sealant 23. The second grinding member 32 is used to grind the second substrate 22 or the sealant 23. Accordingly, the first grinding member 31 and the second grinding member 32 can be of different designs, so that they are suitable but not limited for flexible manufacturing. In practice, the first substrate 21, the second substrate 22, the light-shielding area 13 and the sealant 23 can be ground by the same grinding member or other flexible combination.

FIG. 6 shows the equivalent grinding at two sides. In practice, unequal or uneven grinding at two sides is practical also as shown in FIG. 7 and FIG. 8.

Figure 7:
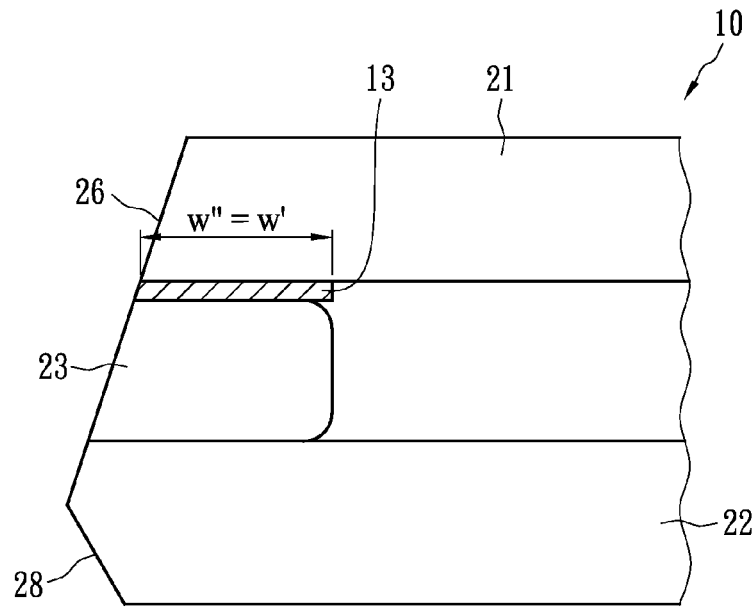
FIGS. 7 and 8 show the display panels through uneven grinding and polishing in accordance with the present invention.
Figure 8:
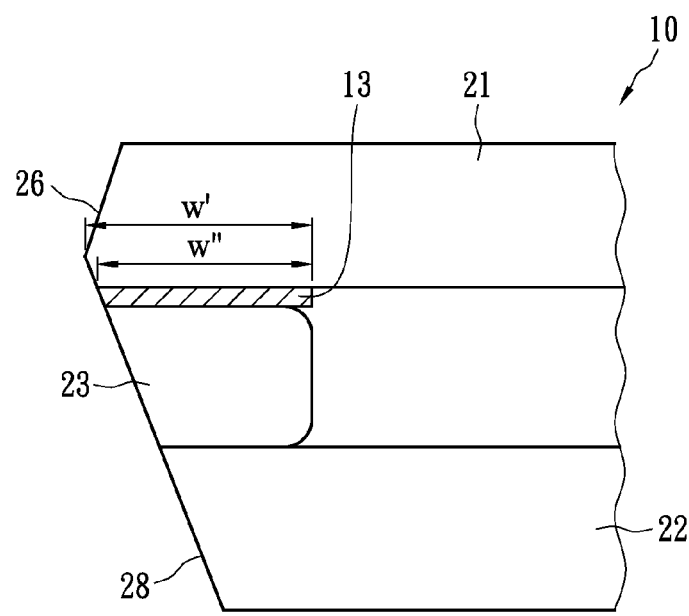

Referring to FIG. 7, in the case of longer time or larger amount of grinding at the first grinding angle θ1, the grinding apparatus 30 can grind the sealant 23 and a portion of the second substrate 22. Accordingly, the first grinding end surface 26 is from the first substrate 21, the light-shielding area 13, and the sealant 23 to a portion of the second substrate 22. In contrast, the grinding time or the grinding amount for grinding at the second grinding angle θ2 is less; thus the second grinding end surface 28 only includes another portion of the second substrate 22. An alternative is shown in FIG. 8, in the case of a shorter time or less amount of grinding at the first grinding angle θ1 and a longer time or larger amount of grinding at the second grinding angle θ2, the first grinding end surface 26 only includes a portion of first substrate 21, and the second grinding end surface 28 is from the second substrate 22, the sealant 23, and the light-shielding area 13 to another portion of the first substrate 21.

Figure 9:
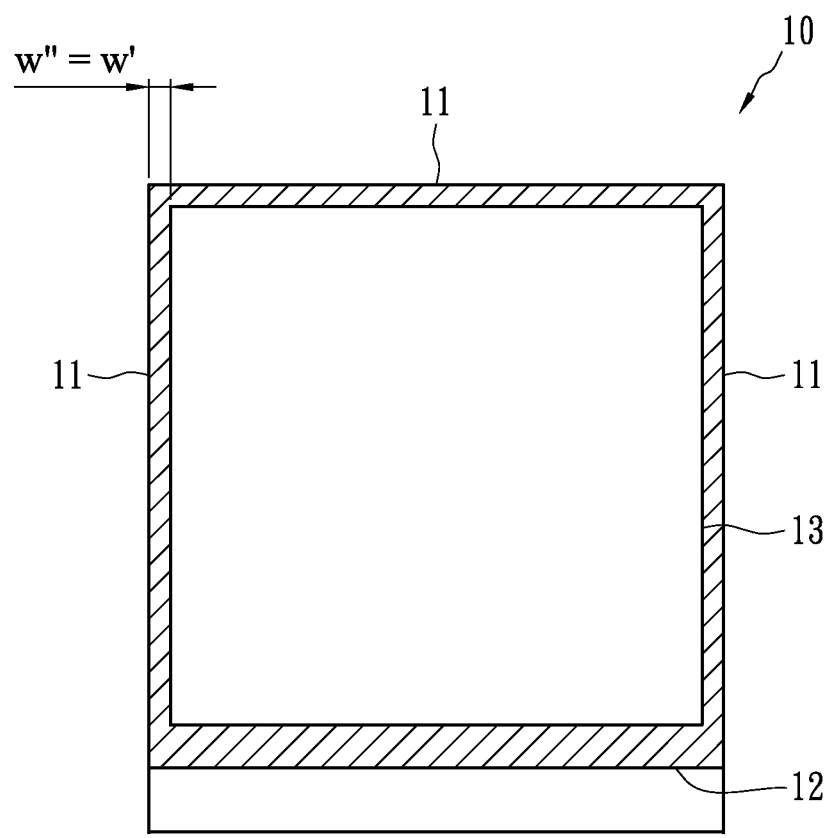
FIG. 9 shows a top view of the display panel after edge narrowing in accordance with the present invention.

Accordingly, the side frames of the display panel 10 can be narrowed. In this embodiment, one or more of the three first sides 11 can be narrowed, and the second side 12 is not narrowed because of the circuits of the display panel, as shown in FIG. 9. The side frame width w' can be narrowed to between 0.35 mm and 1 mm, and is equivalent to the width w" of the light-shielding area, so as to meet the requirement of narrowing edges. However, the grinding end surfaces 26 and 28 of the narrowed side frame of a width w' are rough, may easily resulting in stress concentration at roughness defects of the end surfaces 26 and/or 28, and lower the strength of the first substrate 21 and/or the second substrate 22 of the display panel 10. To resolve this problem, the grinding end surfaces 26 and 28 are further subjected to polishing to decrease the roughness.

Figure 10:
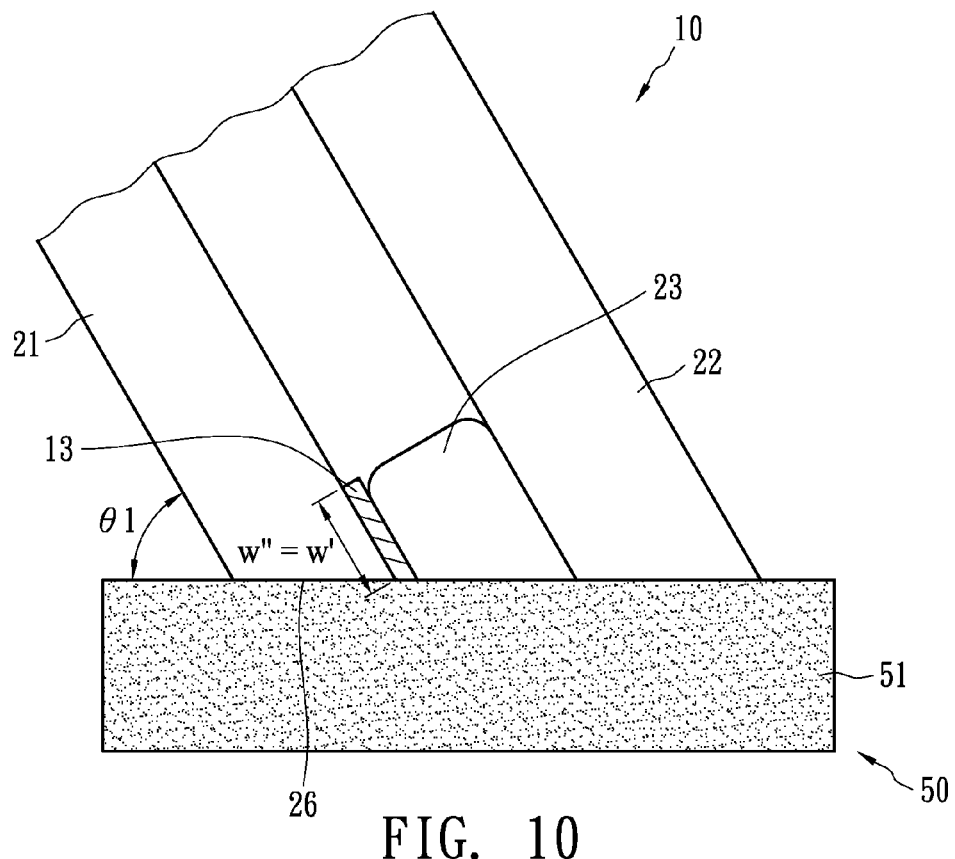
FIGS. 10 and 11 show a polishing process for narrowing edges of the display panel in accordance with an embodiment of the present invention.
Figure 11:
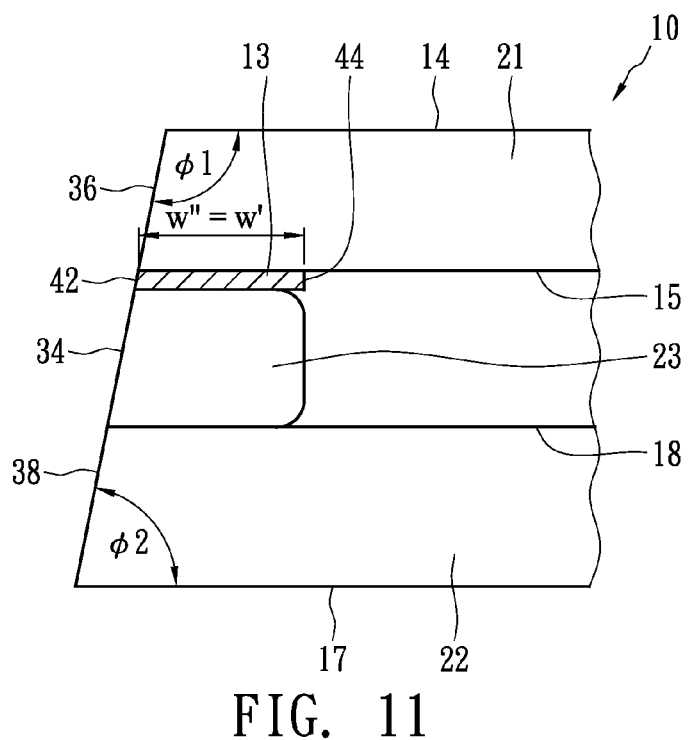

In FIG. 10, the first grinding end surface 26 shown in FIG. 4 is polished by a first polishing member 51 of the polishing apparatus 50. As a result, a first end surface 36 is formed in the first substrate 21, an outer end surface 42 is formed in the light-shielding area 13, a sealant end surface 34 is formed in the sealant 23, and a second end surface 38 is formed in the second substrate 22 as shown in FIG. 11. The arithmetic average roughness Ra of the first end surface 36 and/or the second end surface 38 is decreased to between 0.001 and 0.04 μm, and its maximum roughness height Ry is between approximately 0.1 and 0.5 μm.

As to the structure shown in FIG. 11, the display panel 10 includes the first substrate 21, the second substrate 22 and the sealant 23. The first substrate 21 includes a first outer surface 14, a first inner surface 15 and the first end surface 36. The first outer surface 14 and the first end surface 36 form a first included angle φ1. The second substrate 22 is disposed corresponding to the first substrate 21 and includes a second outer surface 17, a second inner surface 18 and the second end surface 38. The second outer surface 17 and the second end surface 38 form a second included angle φ2. The sealant 23 is disposed between the first inner surface 15 and the second inner surface 18, and includes a sealant end surface 34 between the first end surface 36 and the second end surface 38. The arithmetic average roughness Ra of the first end surface 36 or the second end surface 38 is between 0.001 and 0.04 μm, and the maximum roughness height Ry of the first end surface 36 or the second end surface 38 is between approximately 0.1 and 0.5 μm. The second included angle φ2 is equal to the first grinding angle θ1, and thus φ2 is between 70 and 88 degrees, or preferably, between 78 and 85 degrees. In this embodiment, the first end surface 36, the second end surface 38 and the sealant end surface 34 are in a common plane. The sum of the first included angle φ1 and the second included angle φ2 is around 180 degrees. Therefore, the first included angle φ1 is between 92 and 110 degrees, or preferably, between 95 and 102 degrees.

Figure 12:
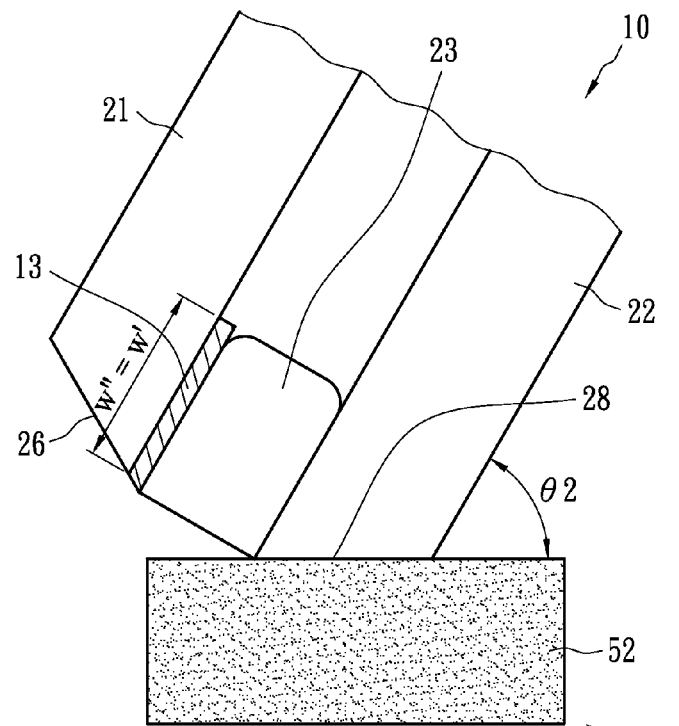
FIGS. 12 and 13 show a polishing process for narrowing edges of the display panel in accordance with another embodiment of the present invention.
Figure 13:
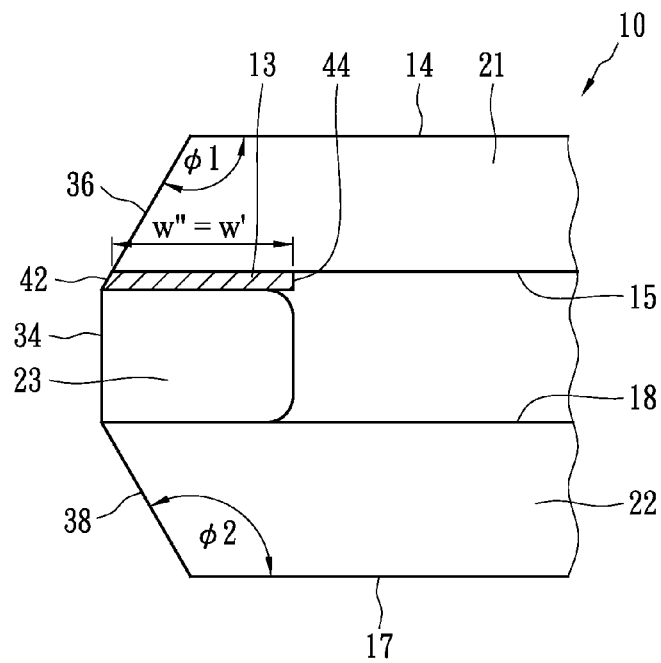

In FIG. 12, in another embodiment, the first grinding end surface 26, the light-shielding area 13, the sealant 23 and/or the second grinding end surface 28 shown in FIG. 6 are polished by a second polishing member 52 of the polishing apparatus 50. As a result, a first end surface 36 is formed in the first substrate 21, an outer end surface 42 is formed in the light-shielding area 13, a sealant end surface 34 is formed in the sealant 23, and a second end surface 38 is formed in the second substrate 22 as shown in FIG. 13. The arithmetic average roughness Ra of the first end surface 36 and/or the second end surface 38 is decreased to between 0.001 and 0.04 μm, and its maximum roughness height Ry is between approximately 0.1 and 0.5 μm.

As to the structure shown in FIG. 13, the display panel 10 includes the first substrate 21, the second substrate 22 and the sealant 23. The first substrate 21 includes a first outer surface 14, a first inner surface 15 and the first end surface 36. The first outer surface 14 and the first end surface 36 form a first included angle φ1. The second substrate 22 is disposed corresponding to the first substrate 21 and includes a second outer surface 17, a second inner surface 18 and the second end surface 38. The second outer surface 17 and the second end surface 38 form a second included angle φ2 therebetween. The sealant 23 is disposed between the first inner surface 15 and the second inner surface 18, and includes the sealant end surface 34 between the first end surface 36 and the second end surface 38. The arithmetic average roughness Ra of the first end surface 36 or the second end surface 38 is between 0.001 and 0.04 μm, and the maximum roughness height Ry of the first end surface 36 or the second end surface 38 is between approximately 0.1 and 0.5 μm. The sum of the first included angle φ1 and the first grinding angle θ1 is 180 degrees, and thus the first included angle φ1 is between 92 and 110 degrees, or preferably, between 95 and 102 degrees. Likewise, the sum of the second included angle φ2 and the second grinding angle θ2 is 180 degrees, and thus the second included angle φ2 is between 92 and 110 degrees, or preferably, between 95 and 102 degrees.

In FIG. 11 and FIG. 13, the light-shielding area 13 is disposed between the first inner surface 15 and the sealant 23, and includes the outer end surface 42 and the inner end surface 44. The outer end surface 42 is connected to the first end surface 36 or the sealant end surface 34. The inner end surface 44 is disposed opposite to the outer end surface 42. The outer end surface 42 is distanced from the inner end surface 44 by a minimum width w" (i.e., the remaining width of the light-shielding area) which is between 0.35 mm and 1 mm. Accordingly, the side frame width w' is equal to the remaining width w" of the light-shielding area. In other words, the side frame width w' is reduced to between 0.35 mm and 1 mm. In an embodiment, the first included angle φ1 is equal to the second included angle φ2.

Likewise, the display panels shown in FIG. 7 and FIG. 8 can be further polished. The first end surface 36, the sealant end surface 34 and a portion of the second end surface 38 are in a common plane, or the second end surface 38, the sealant end surface 34 and a portion of the first end surface 36 are in a common plane, so as to decrease the ground surface roughness. Because the above description is a simple polishing process for those shown in FIG. 7 and FIG. 8, no further figures are illustrated for explanation.

In another embodiment, to increase the edge strength of the display panel 10 and the easiness of the process, only the second substrate 22 (thin-film transistor substrate) is subjected to grinding and polishing, and the first substrate 21 is not ground or polished. The display panel 10 is tilted so that the second substrate 22 and the grinding apparatus 30 form a grinding angle therebetween. Sequentially, the grinding apparatus 30 grinds the second substrate 22 to form a grinding end surface 28 on the second substrate 22 while the display panel 10 is tilted at the grinding angle. The grinding end surface 28 is polished by the polishing apparatus 50 to form an end surface 38.

Figure 14:
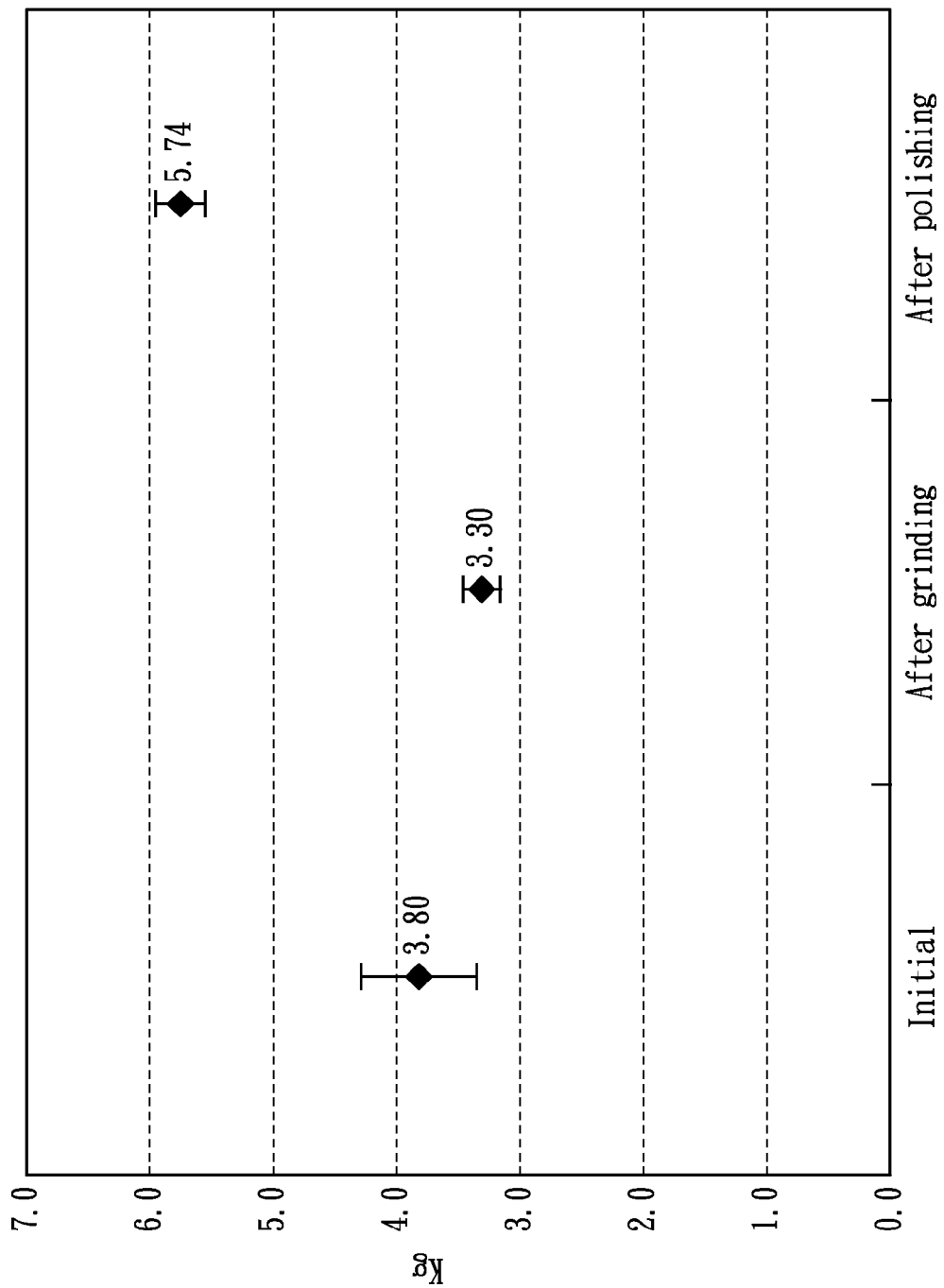
FIG. 14 shows the strengths of the display panel after grinding and polishing.

FIG. 14 is the test result of display panel strength according to American Society for Testing and Materials (ASTM) C158-02, in which the vertical axis is kilograms when the display panel is broken by applying a force, with higher values indicating higher strength, and the horizontal axis is listing the sample status. The test result shows the strength of the side frames after grinding is decreased by around 13%, e.g., the side frame strength is decreased from 3.8 kg to 3.3 kg, whereas the strength of the side frame after polishing is increased by around 51%, e.g., the side frame strength is increased from 3.8 kg to 5.74 kg. This demonstrates that the polishing can effectively increase the side frame strength.

Figure 15:
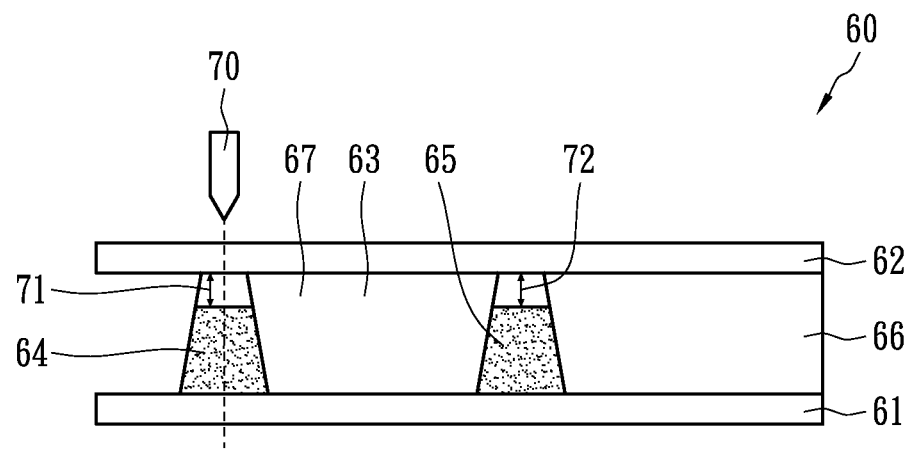
FIGS. 15 to 17 show a display panel and the method for narrowing edges thereof in accordance with another embodiment of the present invention.

In addition to the above, the present invention further proposes another method for narrowing edges as follows. Referring to FIG. 15, a display panel 60 and a cutting apparatus 70 are provided. The display panel 60 includes a first substrate 61, a second substrate 62, a sealant 63, an initial first photo spacer 64, a second photo spacer 65 and a liquid crystal layer 66. The initial first photo spacer 64 and the second photo spacer 65 form a trench 67 at a side of the first substrate 61. The initial first photo spacer 64 is placed outside the sealant 63 and is far from the liquid crystal layer 66. The second photo spacer 65 is placed inside the sealant 63 and is next to the liquid crystal layer 66. The sealant 63 and the liquid crystal layer 66 are placed between the first substrate 61 and the second substrate 62, and the sealant 63 is within the trench 67.

Figure 16:
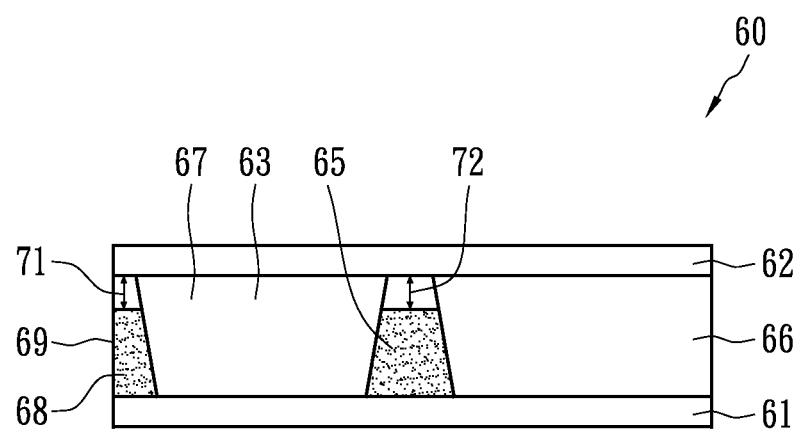

The initial first photo spacer 64, the first substrate 61 and the second substrate 62 are cut by the cutting apparatus 70 to form a first photo spacer 68 and an end surface 69 as shown in FIG. 16. The end surface 69 goes through the initial first photo spacer 64, the first substrate 61 and the second substrate 62. The first photo spacer 68 formed by cutting the initial first photo spacer 64 and the second substrate 62 constitute a first gap 71, and the second photo spacer 65 and the second substrate 62 form a second gap 72.

Figure 17:
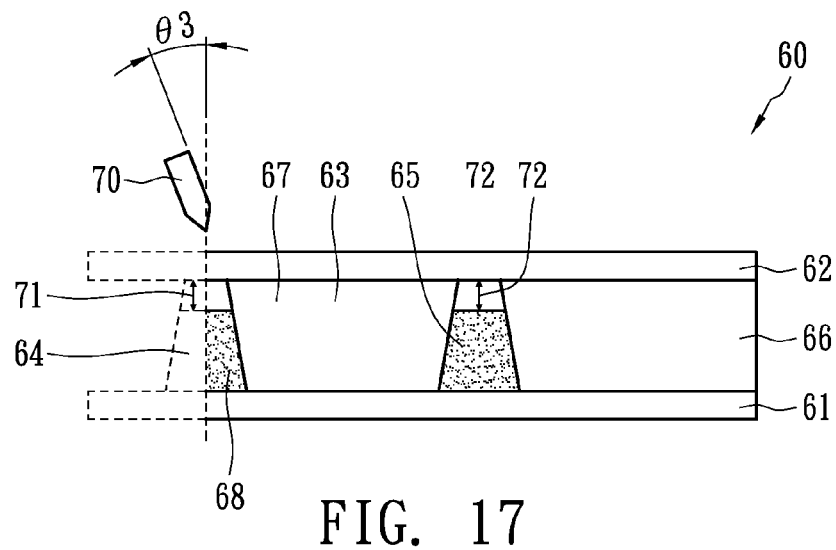

In an embodiment, the display panel 60 or the cutting apparatus 70 is tilted so that the first substrate 61 and the cutting apparatus 70 form a cutting angle θ3 as shown in FIG. 17. The cutting angle θ3 is between 70 and 88 degrees. The distance between the first photo spacer 68 and the liquid crystal layer 66 is between 500 and 800 μm. The first gap 71 or the second gap 72 is 0.5 to 2 μm. The first photo spacer 68 or the second photo spacer 65 has a width between 80 and 300 μm, and the sealant 63 may have a width between 400 and 700 μm.

Figure 18:
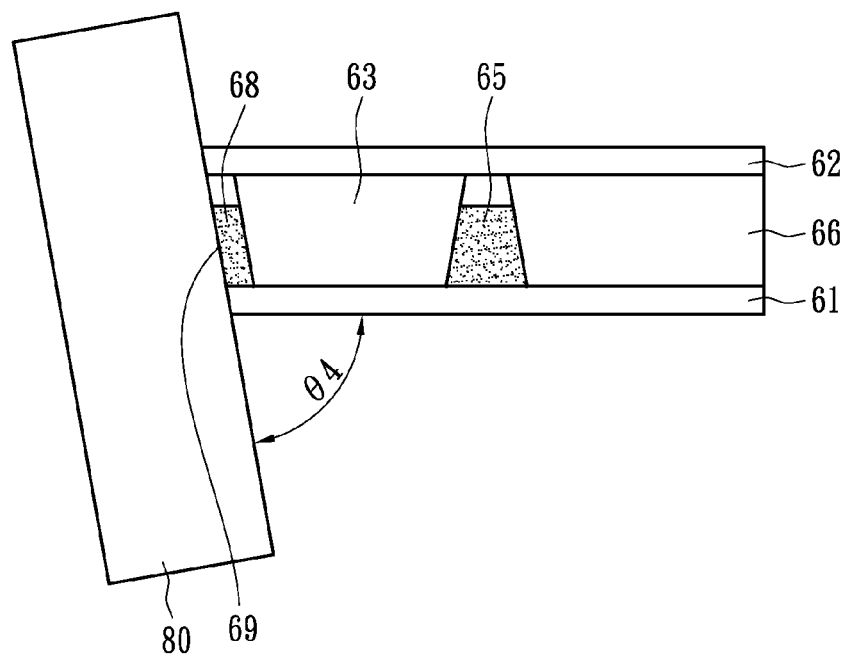
FIG. 18 shows a polishing process for narrowing edges of the display panel in accordance with another embodiment of the present invention.

Like the previous embodiment, in order to increase the strength, the end surface 69 can be polished by a polishing apparatus 80. If there is no tilt when cutting, the end surface 69 is polished directly. If the panel or the cutting apparatus is tilted when cutting, the display panel 60 or the polishing apparatus 80 is tilted according to the cutting angle θ3, by which the first substrate 61 and the polishing apparatus 80 form a polishing angle θ4 therebetween, as shown in FIG. 18. The polishing angle θ4 is between 70 and 88 degrees.

As to the structure shown in FIG. 16, the display panel 60 includes a first substrate 61, a second substrate 62 disposed opposite to the first substrate 61, a liquid crystal layer 66 disposed between the first substrate 61 and the second substrate 62, the first photo spacer 68, a second photo spacer 65 and the sealant 63. The first photo spacer 68 is disposed on the first substrate 61 and between the first substrate 61 and the second substrate 62. The second photo spacer 65 is disposed on the first substrate 61 and between the first substrate 61 and the second substrate 62. A trench 67 is formed between the second photo spacer 65 and the first photo spacer 68. The sealant 63 is formed between the first substrate 61 and the second substrate 62, and within the trench 67. The first photo spacer 68 is placed outside the sealant 63 and is far from the liquid crystal layer 66. The second photo spacer 65 is placed inside the sealant 63 and is next to the liquid crystal layer 66. The first photo spacer 68, the first substrate 61 and the second substrate 62 at a corresponding position form an end surface 69. The end surface 69 goes through the first photo spacer 68, the first substrate 61 and the second substrate 62.

Figure 19:
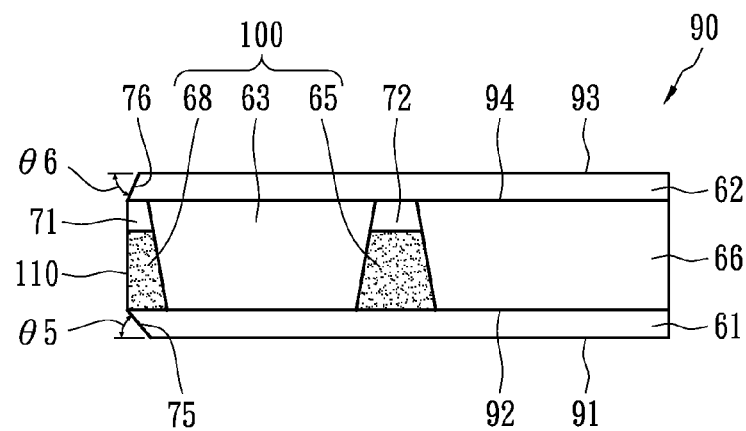
FIG. 19 shows a display panel in accordance with another embodiment of the present invention.

FIG. 19 shows a display panel in accordance with another embodiment of the present invention. A display panel 90 includes a first substrate 61, a second substrate 62, a first photo spacer 68, a second photo spacer 65 and a sealant 63 placed between the first photo spacer 68 and the second photo spacer 65. The first photo spacer 68, the second photo spacer 65 and the sealant 63 may form a liquid crystal confined structure 100. The first substrate 61 includes a first outer surface 91, a first inner surface 92 and a first end surface 75. The first outside surface 91 and the first end surface 75 form a first included angle θ5. The second substrate 62 is disposed opposite to the first substrate 61, and includes a second outer surface 93, a second inner surface 94 and a second end surface 76. The second outer surface 93 and the second end surface 76 form a second included angle θ6. The liquid crystal confined structure 100 is formed between the first inner surface 92 and the second inner surface 94, and has a liquid crystal confined structure end surface 110 between the first end surface 75 and the second end surface 76. In this embodiment, the liquid crystal confined structure end surface 110 is formed at the first photo spacer 68. After polishing, the arithmetic average roughness Ra of the first end surface 75 or the second end surface 76 is decreased to between 0.001 and 0.04 μm, and its maximum roughness height Ry is between approximately 0.1 and 0.5 μm. Preferably, the first included angle θ5 is between 90 and 110 degrees, and the second included angle θ6 is between 70 and 110 degrees.

FIG. 19 shows the case of equivalent grinding at two sides. In practice, unequal or uneven grinding and polishing at two sides is practical also as shown in FIG. 20 and FIG. 21.

Figure 20:
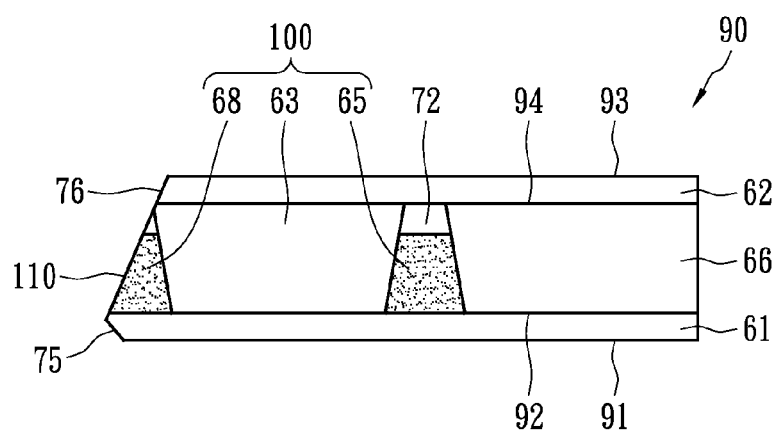
FIGS. 20 and 21 show the display panels through uneven grinding and polishing in accordance with another embodiment of the present invention.

In FIG. 20, the differences compared with FIG. 19 include the display panel 90 comprising the first end surface 75, the liquid crystal confined structure end surface 110 and the second end surface 76. The second end surface 76 is included in the second substrate 62. The first end surface 75 goes from the first substrate 61, the liquid crystal confined structure end surface 110 to a portion of the second substrate 62. The first end surface 75 includes a portion of the first substrate 61. In other words, the second end surface 76, the liquid crystal confined structure end surface 110 and the portion of the first end surface 75 are in a common plane.

Figure 21:
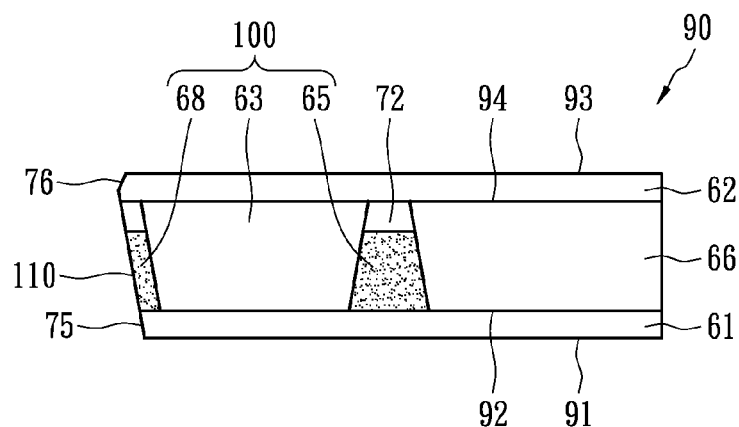

In FIG. 21, the differences compared with FIG. 19 include the display panel 90 comprising the first end surface 75, the liquid crystal confined structure end surface 110 and the second end surface 76. The second end surface 76 is included in the second substrate 62. The first end surface 75 goes from the first substrate 61, the liquid crystal confined structure end surface 110 to a portion of the second substrate 62. The second end surface 76 includes a portion of the second substrate 62. In other words, the first end surface 75, the liquid crystal confined structure end surface 110 and the portion of the second end surface 76 are in a common plane.

The above grinding apparatus and polishing apparatus may use the same or different machines. The grains for the grinding apparatus are larger than the grains for the polishing apparatus. That is, the polishing apparatus can manufacture a surface with less roughness in comparison with the grinding apparatus. The grinding apparatus and the polishing apparatus are not restricted to the use of two different machines, and can be the same machine by replacing grinding rollers or grinding tapes of different roughness.

The above-described embodiments of the present invention are intended to be illustrative only. Numerous alternative embodiments may be devised by those skilled in the art without departing from the scope of the following claims.

What is claimed is:

1. A display panel, comprising:
   a first substrate;
   a second substrate disposed opposite to the first substrate;
   a liquid crystal layer disposed between the first substrate and the second substrate;
   a first photo spacer disposed on the first substrate and between the first substrate and the second substrate;
   a second photo spacer disposed on the first substrate and between the first substrate and the second substrate, and the second photo spacer and the first photo spacer forming a trench therebetween; and
   a sealant disposed between the first substrate and the second substrate and within the trench;
   wherein the first photo spacer is placed outside the sealant and far from the liquid crystal layer, the second photo spacer is placed inside the sealant and next to the liquid crystal layer, the first photo spacer and the first substrate and the second substrate at a corresponding position form an end surface going from the first substrate, the first photo spacer and the second substrate, and the end surfaces of the first substrate, the first photo spacer and the second substrate are coplanar.

2. The display panel of claim 1, wherein the first photo spacer and the second substrate form a first gap, and the second photo spacer and the second substrate form a second gap.

3. A display panel, comprising:
   a first substrate;
   a liquid crystal layer disposed between the first substrate and the second substrate;
   a first photo spacer disposed on the first substrate and between the first substrate and the second substrate;
   a second photo spacer disposed on the first substrate and between the first substrate and the second substrate, and the second photo spacer and the first photo spacer forming a trench therebetween; and
   a sealant disposed between the first substrate and the second substrate and within the trench;
   wherein the first photo spacer is placed outside the sealant and far from the liquid crystal layer, the second photo spacer is placed inside the sealant and next to the liquid crystal layer; and
   wherein each of the first photo spacer and the first substrate comprises an end surface, and the end surface of the first photo spacer is connected to and flush with the end surfaces of the first photo spacer.

\* \* \* \* \*